US012624950B2

(12) United States Patent
Hakimi et al.

(10) Patent No.: US 12,624,950 B2
(45) Date of Patent: May 12, 2026

(54) PASSIVE TOPOLOGICALLY BIASED SAGNAC INTERFEROMETER AS A ROTATIONAL SENSOR CAPABLE OF SENSING MAGNITUDE AND DIRECTION OF ROTATION

(71) Applicants: Farhad Hakimi, Bedford, MA (US); Hosain Hakimi, Bedford, MA (US)

(72) Inventors: Farhad Hakimi, Bedford, MA (US); Hosain Hakimi, Bedford, MA (US)

( * ) Notice: Subject to any disclaimer, the term of this patent is extended or adjusted under 35 U.S.C. 154(b) by 207 days.

(21) Appl. No.: 18/198,230

(22) Filed: May 16, 2023

(65) Prior Publication Data

US 2024/0384991 A1 Nov. 21, 2024

(51) Int. Cl.
 *G01C 19/72* (2006.01)
(52) U.S. Cl.
 CPC .................................. *G01C 19/722* (2013.01)
(58) Field of Classification Search
 CPC .... G01C 19/72; G01C 19/721; G01C 19/722; G01C 19/725; G01C 19/726; G01C 19/727
 See application file for complete search history.

(56) References Cited

U.S. PATENT DOCUMENTS

| | | | | |
|---|---|---|---|---|
| 5,432,637 A | * | 7/1995 | Hakimi | G01M 11/3109 |
| | | | | 385/11 |
| 7,679,753 B2 | * | 3/2010 | Huang | G01C 19/725 |
| | | | | 356/466 |
| 2019/0331492 A1 | * | 10/2019 | Ducloux | G01C 19/721 |
| 2020/0116489 A1 | * | 4/2020 | Wang | G02B 6/29302 |

FOREIGN PATENT DOCUMENTS

CN 109099899 A * 12/2018 ........... G01C 19/721

* cited by examiner

*Primary Examiner* — Michael A Lyons
(74) *Attorney, Agent, or Firm* — , 00

(57) ABSTRACT

Many optical gyroscopes are based on an optical Sagnac interferometer configuration, including various interferometric fiber-optic gyroscopes (IFOGs), to measure the magnitude and direction of rotation. IFOGs require active phase modulation in their fiber coil to decipher the direction of rotation. This patent document discloses a new type of IFOG that utilizes a passive topological (also known as geometric) phase shift to sense the magnitude and direction of rotation without requiring active phase modulation.

6 Claims, 5 Drawing Sheets

PASSIVE TOPOLOGICALLY BIASED SAGNAC INTERFEROMETER AS A ROTATIONAL SENSOR CAPABLE OF SENSING MAGNITUDE AND DIRECTION OF ROTATION

FIELD OF THE INVENTION

The invention relates to fiber-optic sensors, the Sagnac interferometer, a gyroscope, fiber-optic Sagnac interferometry, and a passively biased fiber-optic gyroscope.

BACKGROUND OF INVENTION

The so called open loop minimum configuration of the interferometric fiberoptic gyroscope (IFOG) was developed at Stanford University in 1981 and is depicted in FIG. 1. Light from a light source exits a 2×2 or 2×1 source coupler/circulator and, after going through a 1×2 or 2×2 coil coupler by way of a phase modulator, is split into two beams that propagate around the fiberoptic sensing coil of the gyro in opposite directions. The phase difference between the two light beams is in turn proportional to an input rotation rate about the input axis of the gyro's sensing fiber coil. When not rotating, the interferometer optics ensure that both beams traverse the same optical path and thus yield a nominally zero bias for the gyro. In FIG. 1, in order to distinguish between clockwise and counter clockwise rotation in an open loop configuration, a phase modulator driven by an electric sinusoidal signal must be placed to one side of the fiberoptic sensing coil of the gyro. Applying a sinusoidal voltage to the modulator induces phase modulation onto the light traveling through the optical path of the gyro. The gyro's output is then synchronously demodulated at the first harmonic by a lock-in amplifier. Synchronous demodulation at the first harmonic converts the output of the gyro from that of a raised co-sinusoid to a sinusoidal scale factor. The sinusoidal scale factor is desirable here because of the slope through zero, which is anti-symmetric, placing the gyro at its quadrature point of operation for maximum sensitivity and thereby making it possible to tell the direction of rotation. In other words, without an active phase modulator in FIG. 1, the gyro would not be able to distinguish clockwise from counterclockwise rotation.

The past decades have seen excellent realizations in practical applications of gyroscopic sensors employing active bias, e.g., piezoelectric phase modulators or integrated optics chips (Y-waveguide junctions). The light polarization axis in the fiber coil in FIG. 1 must be controlled. Any change in the light polarization axis behaves as a false rotation signal. Therefore having a depolarized light source and depolarizers in the fiber coil improves the performance of the IFOG substantially. Therefore an improved version of FIG. 1 embraced by most gyro manufacturers uses all linear high birefringence polarization maintaining (PM) fiber coil and components and thus drop the need for polarization control in FIG. 1. PM fiber and components ensure the state of polarization in the fiber does not change due to environmental conditions which as mentioned before cause erroneous rotation signals. However to function effectively, linear PM fibers and components require precise polarization axis alignment between the fiber and the light polarization axis. In practice alignment is within 0.5 degree which limits performance. Furthermore the polarization maintaining performance of PM fiber drops sharply if the length of the fiber coil exceeds 3 kilometer. Additionally, extinction ratios of PM couplers should be better than 20 dB to be suitable for use in practical gyro applications. Finally, PM fiber and components are expensive and add to the price of gyro units considerably.

IFOG with PM fiber and components still require active phase modulation and has several shortcomings and disadvantages:

1. Phase modulators require sinusoidal or square wave signal generator and driver as FIG. 1 indicates. The phase modulator itself is prone to optical bias drifts and requires complex electronic driver countermeasures.
2. A practical phase modulator is a piezoelectric transducer with standard or PM fiber wrapped around it. The process is mechanical and results in unwanted stresses on the fiber which reduces its longevity.
3. The modulation frequency of piezoelectric transducers is limited. For a fiber coil of 100 meters, the modulation rate is about 1 MHz (~100 kHz-km). This is near the upper limit of piezoelectric transducers and consequently the length of the fiber coil cannot be chosen shorter if reduction of coil length and cost is desired.
4. In a vibration prone environment, the piezoelectric transducer can generate voltages (causing erroneous phase shifts) that obscure the real rotation from fictitious signals.
5. Alternatively, lithium niobate integrated optical chip phase modulators can be used. While these modulators do not have the mentioned modulation rate limitations of piezoelectric transducers, they are costly and still subject to optical drift due to radiation, thermal stress, and the acoustic environment.
6. In some circumstances, it is desirable to have the gyro's sensing coil separated from its optoelectronics box. The separation also thermally insulates the sensing coil and reduce optical drifts caused by the heat of electronic components. Some gyro manufacturers accomplish this by using a tethered optical cable between the sensing coil and its optoelectronics. However, an active phase modulator in the gyro sensing coil still requires power to operate. This requires an additional electric cable to the sensing fiber coil. This limits the length of the tethered cable to a few meters due to concern for electronic noise.

In line with the mentioned shortcomings of having a phase modulator, Kajioka in 1984 proposed a new IFOG with a passively biased mechanism and thus no phase modulator [1,2]. However the design required having a linear PM fiber coil designed for light with a linear polarization axis. The device was passively biased at its quadrature point of operation by a bulk optics polarization beam splitter and a quarter-wave plate. However this IFOG suffered from excessive drifts due in part to difficulty aligning the polarization axis of light and PM fiber. Additionally no tethered remote gyro sensor coil can be implemented with this approach. Another attempt for an IFOG with passive bias was done by Hung chia Huang [3] in 2010. His passive bias method involved using a fiber-optic magneto-optic Faraday rotator performing a nonreciprocal 45 degree rotation with a zero to fast and a fast to zero quarter-wave plates attached to both sides of the integral unit. This method only works with light with circular polarization. Therefore it requires circular PM fibers and components to operate. Circular PM fibers have proved to be as difficult as their linear PM counterparts to manufacture. Circular PM components also have poorer performance than linear PM parts and are currently not being pursued for gyro application.

Despite the said setbacks, efforts have never been stopped in attempting to passively bias a Sagnac interferometer for IFOG applications. The rationale for passive biasing is strong and includes simplicity and robustness in construction, lower cost, lower noise, easier adjustment, higher accuracy and stability in long-term operation, etc.

SUMMARY AND OBJECTS OF THE INVENTION

It is therefore the object of the present invention to provide a new open loop minimum configuration IFOG that requires no active phase modulator and no PM fiber in its sensing coil. The present invention utilizes a topological phase approach to achieve passive bias in an optical fiber gyroscope. Topological photonics is an emerging research area that focuses on the topological states of classical light and is ubiquitous in physics [4]. Although manifestations of this phase have been reported in many different settings [5], perhaps it is in optics where it has had the greatest impact. The concept of topological phase (also known as geometric phase) was first introduced by Shivaramakrishnan Pancharatnam in 1956 while studying the interference between optical waves of different polarizations [6]. Even though at a first glance this problem could seem trivial, Pancharatnam unveiled its true complexity, discovering that an optical wave acquires a phase dependent on the path followed by the polarization on the Poincare sphere.

The additional advantages of passive bias with a standard fiber coil are as follows;

1. With no phase modulation requirement in the gyro sensing coil, the length of fiber in the sensing coil can be chosen arbitrarily short or much longer than the 3 km limit imposed by PM fiber.
2. No need for alignment to the fiber PM axis.
3. With the present invention the optical sensor coil and its optoelectronics have the option to reside in two different locations and be connected through a passive optical fiber spanning many meters or kilometers. This also results in a reduction in optical drifts due to thermal isolation of the gyro sensor coil and its optoelectronics.

DETAILED DESCRIPTION OF THE PREFERRED EMBODIMENT

Figure 1:
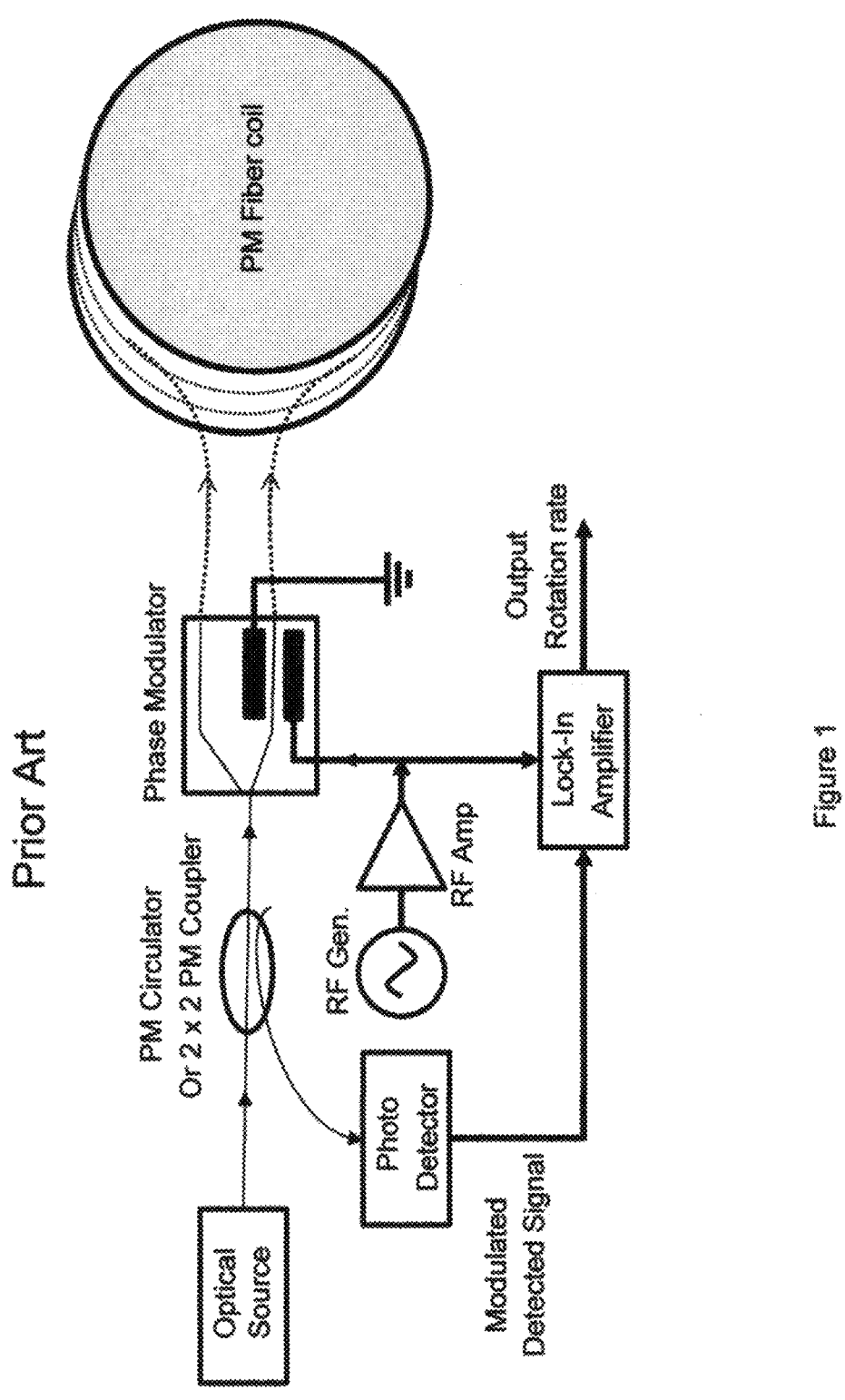
FIG. 1 illustrates a schematic diagram of a conventional Sagnac interferometric fiber-optic gyroscope (IFOG) known in the prior art, which includes an active phase modulator and a polarization-maintaining optical fiber loop.
Figure 2:
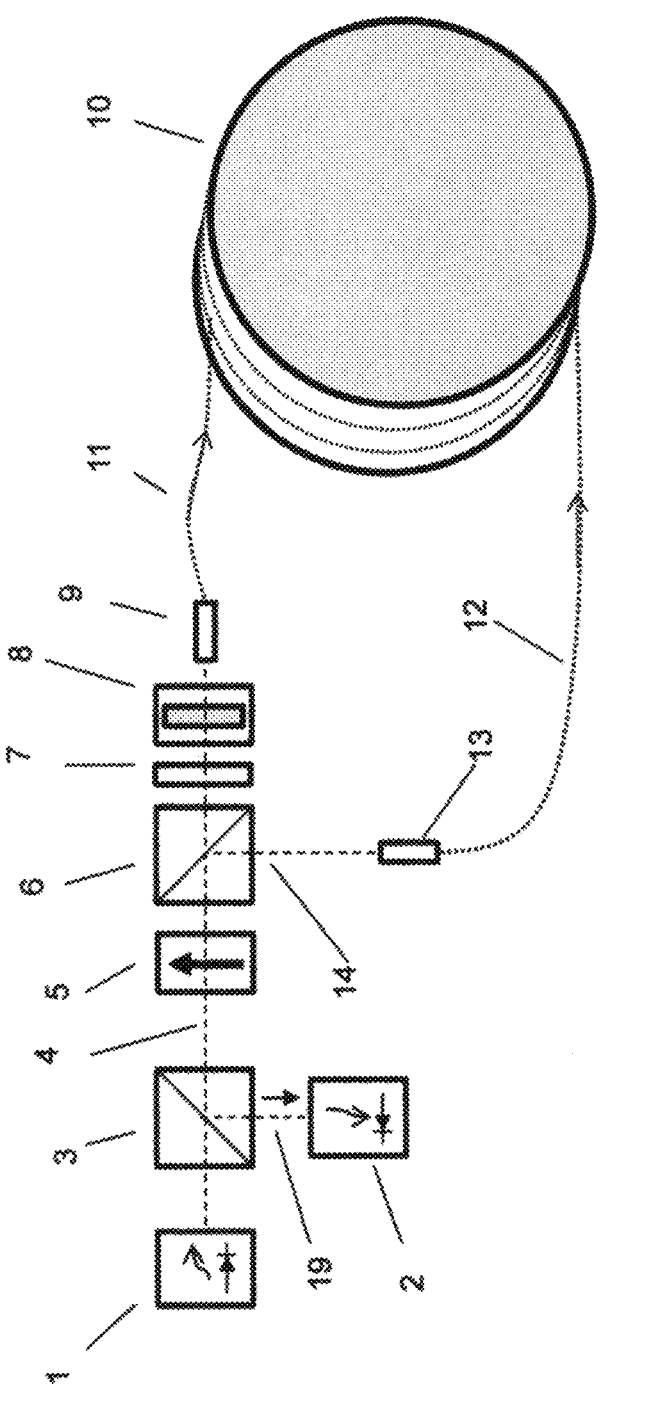
FIG. 2 is a schematic diagram of an interferometric fiber-optic gyroscope in accordance with the present invention, illustrating the integration of a topological phase bias element and a depolarized light source for passive biasing.

FIG. 2 depicts a first preferred embodiment of the present invention. Optical source (1) emanates preferably low-coherence depolarized light through optical path (4) that goes through a non-polarizing beam splitter (3), polarizer (5), non-polarizing beam splitter (6), depolarizer (7), a topological phase bias element (8), and a fiber coupling element (9). In the case where path (4) is a collimated free optical space, element (9) is a collimator pigtailed with a single-mode non-PM fiber (11). Light from fiber (11) couples to a non-PM single-mode optical fiber coil (10) in the clockwise direction. The non-polarizing beam splitter (6) also redirects part of light path (4) into light path (14). Light path (14) goes through a fiber coupling element (13) which is coupled to a single-mode non-PM fiber (12). Light from fiber (12) reaches coil (10) in the counterclockwise direction. Clockwise light from fiber coil (10) goes through optical fiber (12), collimator (13), and through optical path (14) and gets redirected back into the polarizer (5) by the non-polarizing beam splitter (6). Counterclockwise light from coil (10) goes through fiber (11) into collimator (9), topological phase bias element (8), depolarizer (7), and the non-polarizing beam splitter (6) and interferes with the clockwise light at the polarizer (5). The result of this interference reaches the photo detector (2) by way of optical path (4), the non-polarizing beam splitter (3) and optical path (19). Since clockwise and counterclockwise paths have crossed the topological phase bias element (8), they each acquire a phase shift topologically. The bias phase shift of the Sagnac interferometer is then the difference between the clockwise and counterclockwise topological phase shifts. It should be noted that optical paths (4), (14) and (19) can be free space, optical fibers or integrated optical waveguides. The non-polarizing beam splitter (3) can also be a circulator or a 2×1 or 2×2 single-mode fiber coupler or an integrated optical waveguide. The non-polarizing beam splitter (6) can be a 1×2 or 2×2 single-mode fiber coupler or an element of integrated optics. Further we can choose the non-polarizing beam splitter (6) as a polarizing beam splitter with the polarizer (5) rotated by 45 degrees with respect to it. The depolarizer (7) preferably is of a Lyot type. The depolarizer (7) can also be placed on optical path (14) instead of path (4).

Figure 3:
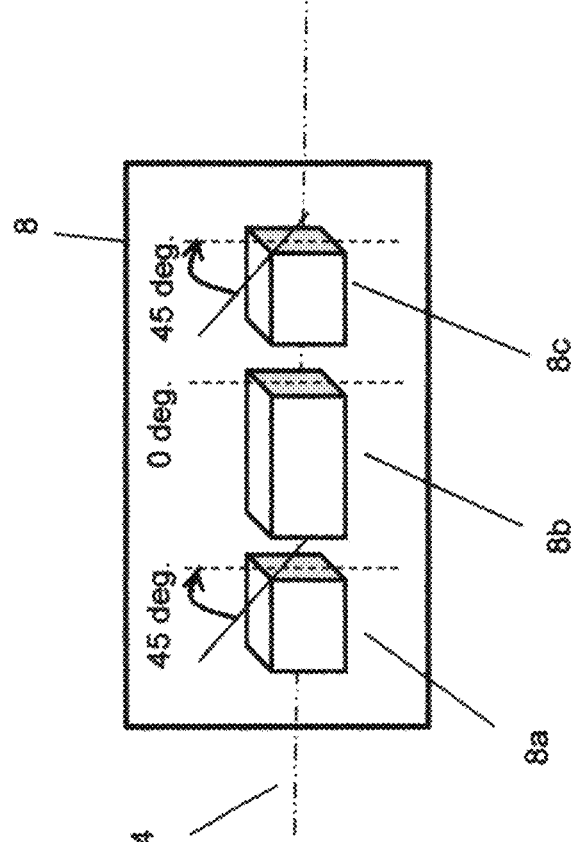
FIG. 3 is a schematic illustration of the topological phase bias element employed in the gyroscope of the present invention, comprising a sequence of achromatic wave plates configured to induce a geometric phase shift independent of wavelength.

FIG. 3 represents the preferred embodiment of the topological phase bias element (8). Elements (8a) and (8c) are achromatic quarter-wave plates with their optical axis rotated at 45 degrees with respect to the optical axis of (8b) which is an achromatic half-wave plate. The orientation of the half-wave plate (8b) at 45 degrees with respect to the quarter-wave plates (8a) and (8c) ensures that the interferometer operates at the quadrature point. If desired, the operating point of the interferometer may be adjusted by altering the orientation of the half-wave plate (8b) relative to the quarter-wave plates (8a) and (8c). Element 8 is characterized as a topological phase bias element due to its inherent robustness against variations in source wavelength and polarization state. Specifically, the inclusion of achromatic wave plates ensures that the phase shift introduced by element (8) remains substantially invariant despite changes in the center wavelength of the optical source (1). This wavelength insensitivity indicates that the phase shift is not governed by spectral properties but arises from a geometric phase mechanism, such as the Pancharatnam, which is a hallmark of topological behavior.

Figure 4:
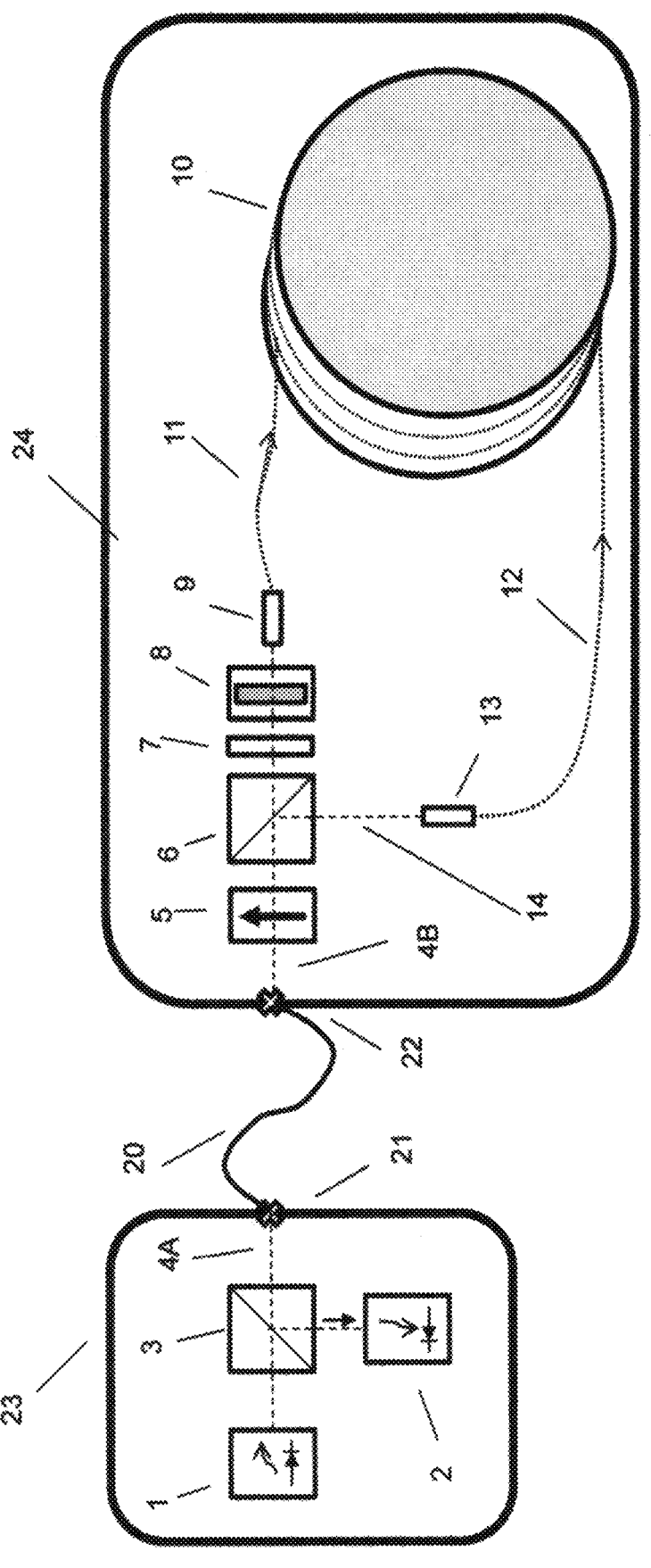
FIG. 4 is a schematic diagram of an embodiment of a passively biased interferometric fiber-optic gyroscope in accordance with the present invention, utilizing a depolarized light source and a tethered standard single-mode optical fiber for remote sensing applications.

FIG. 4 represents a second preferred and tethered embodiment of the present invention. Here box (23) has a fiber-optic bulkhead connector (21), and is connected to a fiber-optic bulkhead (22) through a non-PM single-mode optical fiber to box (24). Box (23) comprises a depolarized light source (1), a non-polarizing beam splitter or circulator (3), and a photo detector (2) with the same functionality as explained in the first preferred embodiment of the present invention. Box (24) comprises a polarizer (5), a non-polarizing beam splitter (6), depolarizers (7), a topological phase bias element (8) and fiber coupling elements (9) and (13) and a fiber coil (10) with the same functionality as the first preferred embodiment. An optical single-mode non-PM fiber cable (20) connects light path (4A) on box (23) to (4B) on box (24). If light paths (4A) and (4B) are chosen to be optical fibers then connections (21) and (22) can also represent fusion-spliced connections.

Figure 5:
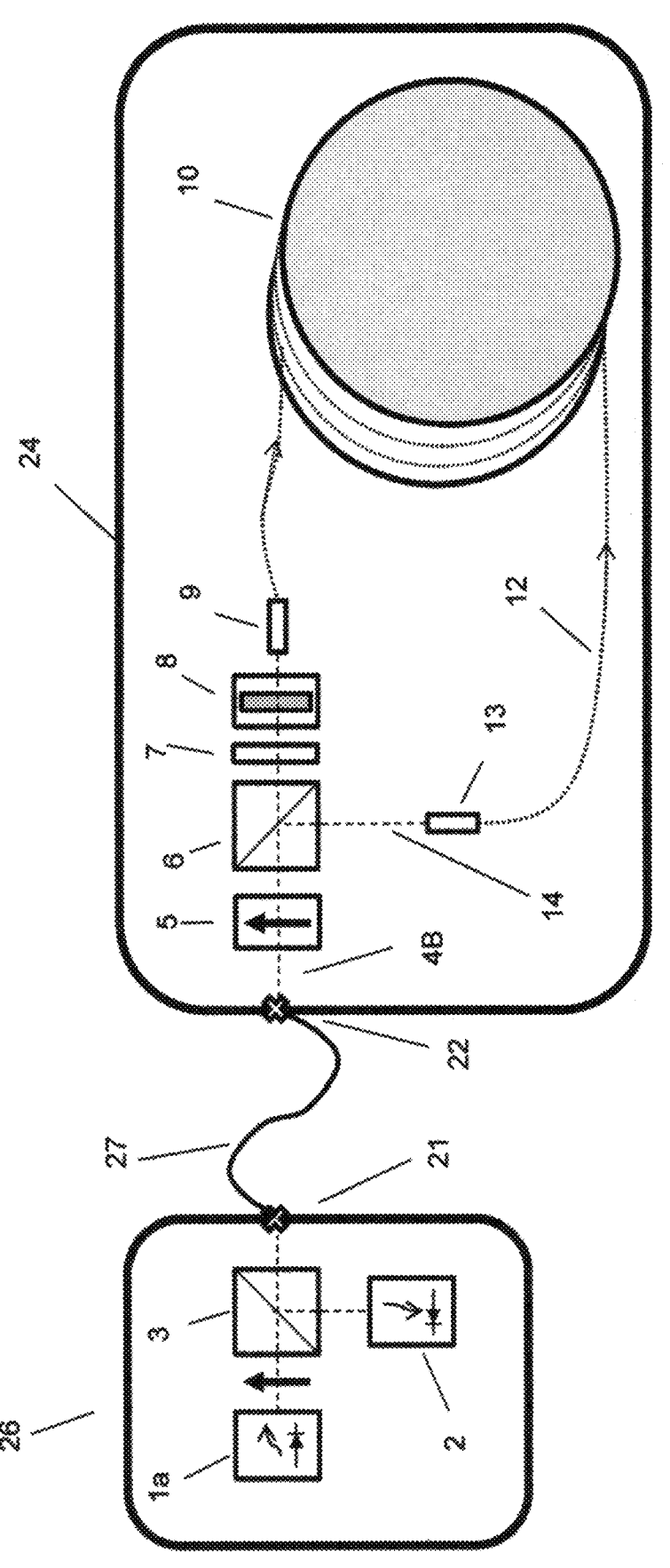
FIG. 5 is a schematic diagram of an alternative embodiment of a passively biased interferometric fiber-optic gyroscope in accordance with the present invention, utilizing a polarized light source and a tethered polarization-maintaining single-mode optical fiber.

FIG. 5 represents a third preferred and tethered embodiment of the present invention. Here the optical fiber cable (27) represents a single-mode PM fiber connecting box (26) to box (24). Box (24) has the same functionality as explained in the second preferred embodiment of the present invention. In this case the light source (la) in box (26) is linearly polarized and its polarization axis is aligned to the slow or fast axis of the PM fiber cable (27). The PM axis of fiber (27) is also aligned to the linear polarization axis of the polarizer (5) of box (24). Accordingly, the polarization axis of the reflected light from box (24) is also aligned to the slow or fast axis of the PM fiber cable (27).

REFERENCES

1. H. Kajioka, "Optical fiber laser gyroscope," Japanese Patent No. 57-78964, 1983.
2. H. Kajioka and H. Matsumura, "Single polarization optical fiber and its applications," Hitachi Review, vol. 33, pp. 215-218, 1984.
3. H.-C. Huang, U.S. Pat. No. 7,679,753 B2, issued Mar. 16, 2010.
4. C. Cisowski, J. B. Götte, and S. Franke-Arnold, "Geometric phases of light: Insights from fiber bundle theory," Reviews of Modern Physics, vol. 94, 031001, Jul. 18, 2022.
5. A. Shapere and F. Wilczek, Geometric Phases in Physics, World Scientific, Singapore, 1989.
6. S. Pancharatnam, "Generalized theory of interference and its applications," Proceedings of the Indian Academy of Sciences-Section A, vol. 44, pp. 247-262, 1956.

The invention claims are:

1. A fiber optic Sagnac interferometer passively biased by a topological phase element comprising: a light source; a photodetector; a linear polarizer; a depolarizer; a topological phase element comprising: a first achromatic quarter-wave plate, optically connected to an achromatic half-wave plate with its optical axis oriented at 45 degrees relative to the axis of the first achromatic quarter-wave plate, further optically connected to a second achromatic quarter-wave plate with its optical axis oriented at 45 degrees relative to the axis of the achromatic half-wave plate; a non-polarization-maintaining single-mode fiber coil; a first non-polarizing beam splitter/circulator; a second non-polarizing beam splitter; the output of said light source optically connected to the input of said first non-polarizing beam splitter/circulator; the reflected output of said first beam splitter/circulator optically connected to said photodetector; the transmitted output of said first beam splitter/circulator optically connected to the input of said linear polarizer; the output of said linear polarizer optically connected to the input of said second non-polarizing beam splitter; the transmitted output of said second non-polarizing beam splitter optically connected to the input of said depolarizer; the output of said depolarizer optically connected to said topological phase bias element; the output of said topological phase bias element optically connected to a first input of said fiber coil; the reflected output of said second non-polarizing beam splitter optically connected to a second input of said fiber coil.

2. The interferometer of claim 1, wherein said light source is depolarized.

3. The interferometer of claim 1, wherein said light source is linearly polarized with its polarization axis aligned to the transmission axis of said linear polarizer.

4. A tethered passively biased Sagnac interferometer comprising: a first optoelectronic box containing a light source and a photodetector; the output of said light source optically connected to the input of a first non-polarizing beam splitter/circulator residing in said first box; the reflected output of said first non-polarizing beam splitter/circulator optically connected to said photodetector; the transmitted output of said first non-polarizing beam splitter/circulator optically connected to a first input end of a fiber cable tethered outside of said first box; a second optics box optically connected to a second input end of said tethered fiber cable; residing in said second optics box: a linear polarizer; a second non-polarizing beam splitter; a depolarizer; a topological phase bias element; a non-polarization-maintaining single-mode fiber coil; the output of said linear polarizer optically connected to the input of said second non-polarizing beam splitter; the transmitted output of said second non-polarizing beam splitter optically connected to the input of said depolarizer; the output of said depolarizer optically connected to said topological phase bias element; the output of said topological phase bias element optically connected to a first input of said fiber coil; the reflected output of said second beam splitter optically connected to a second input of said fiber coil; wherein said topological phase bias element comprises: a first achromatic quarter-wave plate, optically connected to an achromatic half-wave plate with its optical axis oriented at 45 degrees relative to the axis of the first achromatic quarter-wave plate, further optically connected to a second achromatic quarter-wave plate with its optical axis oriented at 45 degrees relative to the axis of the achromatic half-wave plate.

5. The interferometer of claim 4, wherein said light source emits depolarized light and said fiber cable is a single-mode optical fiber.

6. The interferometer of claim 4, wherein said light source emits linearly polarized light; said fiber cable, residing outside of said first optoelectronic box, is a polarization-maintaining single-mode fiber with its principal axis aligned to the polarization axis of said polarized light source; and the polarization axis of said polarization-maintaining single-mode fiber cable is aligned to the transmission axis of said linear polarizer in the second optics box.

* * * * *